United States Patent
Franke et al.

(10) Patent No.: US 7,250,794 B2
(45) Date of Patent: Jul. 31, 2007

(54) VOLTAGE SOURCE CONVERTER

(75) Inventors: Ralf-Michael Franke, München (DE); Franz Imrich, Erlangen (DE)

(73) Assignee: Siemens Aktiengesellschaft, München (DE)

(*) Notice: Subject to any disclaimer, the term of this patent is extended or adjusted under 35 U.S.C. 154(b) by 94 days.

(21) Appl. No.: 10/924,252

(22) Filed: Aug. 23, 2004

(65) Prior Publication Data
US 2005/0041443 A1   Feb. 24, 2005

(30) Foreign Application Priority Data
Aug. 21, 2003  (DE) ................. 103 38 476

(51) Int. Cl.
*H03K 3/00* (2006.01)
(52) U.S. Cl. ................... 327/111; 318/800; 318/801; 318/138; 318/254; 318/439; 361/93.7; 361/93.8; 361/93.9; 361/106
(58) Field of Classification Search ................. 327/110, 327/111
See application file for complete search history.

(56) References Cited

U.S. PATENT DOCUMENTS

| | | | | |
|---|---|---|---|---|
| 4,697,131 A | * | 9/1987 | Schauder et al. | 318/762 |
| 4,788,635 A | * | 11/1988 | Heinrich | 363/35 |
| 4,933,622 A | * | 6/1990 | Fox et al. | 320/135 |
| 5,347,166 A | * | 9/1994 | Schauder | 307/113 |
| 5,513,058 A | * | 4/1996 | Hollenbeck | 361/36 |
| 5,568,368 A | * | 10/1996 | Steigerwald et al. | 363/17 |
| 5,587,647 A | * | 12/1996 | Bansal et al. | 322/45 |
| 5,606,247 A | * | 2/1997 | Sutrina | 322/50 |
| 5,644,483 A | * | 7/1997 | Peng et al. | 363/37 |
| 6,650,515 B2 | * | 11/2003 | Schmalz | 361/42 |
| 6,731,082 B2 | * | 5/2004 | Pelonis | 318/254 |
| 6,957,103 B2 | * | 10/2005 | Schmidt et al. | 607/5 |

FOREIGN PATENT DOCUMENTS

| | | |
|---|---|---|
| DE | 100 18 372 A1 | 10/2001 |
| DE | 101 59 639 A1 | 6/2003 |
| JP | 03173356 A | 7/1991 |

OTHER PUBLICATIONS

"Netzrückwirkungen bei Frequenzumrichtern" (*Line Feedback in Frequency Converters*) by Karl Simon, printed in the German-language professional journal "etz", vol. 10, pp. 32 and 33, 2003.

* cited by examiner

Primary Examiner—Timothy P. Callahan
Assistant Examiner—Hiep Nguyen
(74) Attorney, Agent, or Firm—Henry M. Feiereisen

(57) ABSTRACT

A voltage source converter with a line-side diode rectifier, a load-side inverter with an electronic circuit, a power supply for the electronic circuit, and a slim DC link with a DC link capacitor is described. The slim DC link connects a DC output side of the line-side diode rectifier with a DC input side of the load-side inverter. A buffer capacitor is connected across the power supply, and a decoupling diode and a current limiting circuit are electrically connected in series with the buffer capacitor. The serially connected buffer capacitor, decoupling diode and current limiting circuit are connected in parallel with the DC link capacitor. This arrangement results in a voltage source converter that has an improved service reliability even in unstable power grids, without adding circuit complexity to the line input.

5 Claims, 1 Drawing Sheet

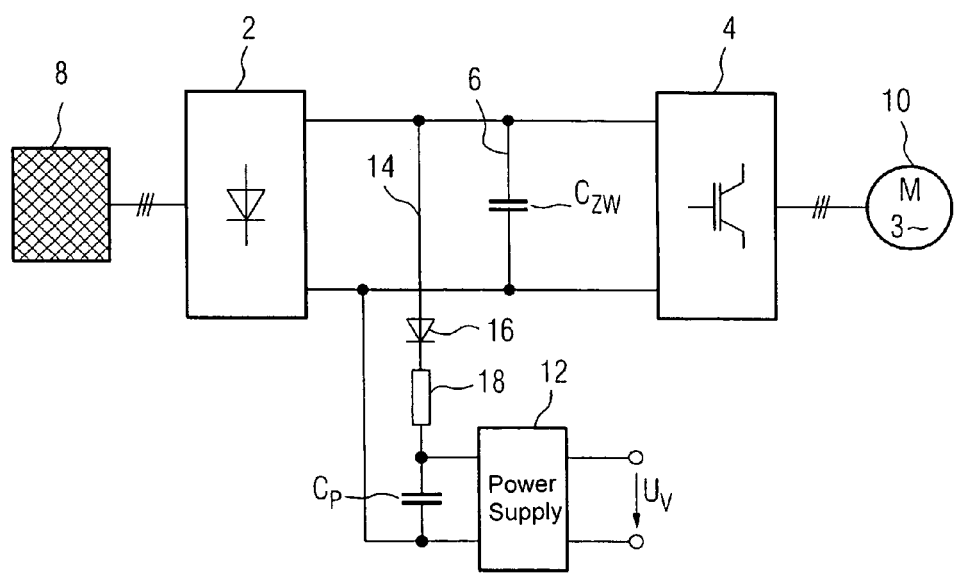

VOLTAGE SOURCE CONVERTER

CROSS-REFERENCES TO RELATED APPLICATIONS

This application claims the priority of German Patent Application, Serial No. 103 38 476.6, filed Aug. 21, 2003, pursuant to 35 U.S.C. 119(a)-(d), the disclosure of which is incorporated herein by reference.

BACKGROUND OF THE INVENTION

The invention relates to a voltage source converter with a line-side diode rectifier, a slim DC link and a power supply for the electronics of a load-side inverter of this converter.

Commercially available voltage source converters, also referred to as frequency converters, have converters on both the line side and the load side which are connected with one another on their respective DC side by a voltage DC link. The line-side inverter is implemented as a line-commutated converter, for example a diode rectifier, while the load-side converter is implemented as a self-commutated converter, for example a pulsed inverter. The voltage DC link includes one or more electrolytic capacitors. Moreover, a frequency converter includes a power supply for the electronics of the pulsed inverter which can be electrically connected, for example, by a voltage converter in parallel with the DC link capacitor. In the event of a power line failure, the power supply of the electronics of the pulsed inverter can then remain energized for a predetermined period of time. Charge to the DC link capacitor is supplied from the kinetic energy of the converter-powered motor. The DC link capacitor discharges after the kinetic energy is consumed.

If the DC link capacitor is essentially discharged before the line power is restored, then the line input of the converter experiences a high current flow. The magnitude of this charging current depends, on one hand, on the line impedance of the power line and, on the other hand, on the capacitance value of the DC link capacitor of the frequency converter. The high charging current can damage or destroy the diodes of the line-side converter, which may be prevented by using diodes with a highly $I^2T$ value. However, such diode rectifier would be over-engineered for the power required for continuous operation.

Other options for keeping the charging current low are disclosed in the publication "Netzrückwirkungen bei Frequenzumrichtern" (*Line Feedback in Frequency Converters*) by Karl Simon, printed in the German-language professional journal "etz", Vol. 10, pp. 32 and 33, 2003. This publication describes various approaches for limiting line feedback in frequency converters. Line feedback in frequency converters is produced predominantly by the DC link capacitor by the current that recharges the capacitor during the voltage peak of a half period.

Conventional methods for reducing line feedback include the installation of additional chokes, either in the DC link or at the input of the frequency converter. In other words, the choke represents a current limiter that limits the recharging current. However, installing an additional choke disadvantageously adds to the cost and also requires a fair amount of space.

According to the aforementioned publication, this disadvantage can be overcome by using frequency converters with a so-called slim DC link. Such frequency converter has a significantly lower capacitance value of the DC link capacitor. The small capacitance value of the DC link capacitor allows for the use of foil capacitors instead of electrolytic capacitors. However, the DC link voltage then has a large ripple, and the average value of the DC link voltage is reduced. To prevent the ripple of the DC link voltage from affecting the quality of the rotation speed control of a converter-powered rotor, a modified control process is used for a pulse width modulator that takes the ripple into account. However, the motor then disadvantageously requires a more than 10% greater motor current under normal operating conditions, which increases the motor temperature. Because of the aforementioned disadvantages, a frequency converter with a slim DC link is preferably used in applications with pumps and fans.

Because of the smaller capacitance of the DC link capacitor, the power supply for the electronics of the pulsed inverter of the frequency converter that incorporates a slim DC link is connected to one phase of the supply line. However, this causes the power supply to fail in the event of line power interruptions, so that the operation of the frequency converter cannot be continued. If a frequency converter with a slim DC link is to stay operational even during a power failure, then the power supply must be buffered. This requires a special configuration of the power supply which also tends to be more costly.

Line power interruptions are more frequent in countries that have unstable power grids. However, these countries often require an improved service reliability, which can be provided by installing a choke in the frequency converters connected to such power grids. Because it is difficult in most cases to predict the line conditions ahead of time, substantial design work is required to dimension such choke. Otherwise, the frequency converter may fail.

If a frequency converter with a slim DC link is connected to an unstable power grid, failures of the frequency converter cannot be prevented even when using buffered power supplies and kinetic buffering.

It would therefore be desirable and advantageous to provide a voltage source converter which obviates prior art shortcomings and specifically has a higher service reliability even when connected to unstable power grids, without adding complexity and/or cost to its power line input.

SUMMARY OF THE INVENTION

According to an aspect of the invention, a voltage source converter includes a line-side diode rectifier, a load-side inverter with an electronic circuit, a power supply for the electronic circuit, and a slim DC link with a DC link capacitor. The slim DC link connects a DC output of the line-side diode rectifier with a DC input side of the load-side inverter. The voltage source converter further includes a buffer capacitor connected across the power supply, and a decoupling diode and a current limiting circuit electrically connected in series with the buffer capacitor. The series connection of the buffer capacitor, decoupling diode and current limiting circuit are connected in parallel with the DC link capacitor.

By using the topology according to the invention for a voltage source converter, the power supply is decoupled from the slim DC link of the DC link converter, so that depending on the sizing of the buffer capacitor, power to the electronics of the pulsed inverter can be maintained in the event of a line failure. When the line voltage returns, only a small recharging current flows due to the relatively small capacitance value of the DC link capacitor. This small recharging current does not cause $I^2T$ loading of the diodes of the line-side rectifier, so that the diode rectifier of the DC link converter no longer needs to be over-engineered.

As a result, the voltage source converter has an increased service reliability even in unstable power grids, without adding complexity to its line power input.

According to an advantageous embodiment of the invention, the DC link capacitor can include a foil capacitor, with the capacitance value of the buffer capacitor being selected to bridge a predetermined duration of a line power failure.

According to another advantageous embodiment of the invention, the current limiting circuit can include a resistor and/or an NTC thermistor.

BRIEF DESCRIPTION OF THE DRAWING

Other features and advantages of the present invention will be more readily apparent upon reading the following description of a currently preferred exemplified embodiment of the invention with reference to the accompanying drawing, in which the only FIGURE shows a schematic block diagram of a voltage source converter according to the invention.

DETAILED DESCRIPTION OF PREFERRED EMBODIMENTS

The depicted embodiment is to be understood as illustrative of the invention and not as limiting in any way. It should also be understood that the drawing is not necessarily to scale and that the embodiment may be illustrated by graphic symbols, phantom lines, and/or diagrammatic representations. Details which are not necessary for an understanding of the present invention or which render other details difficult to perceive may have been omitted.

Turning now to the only FIGURE, a voltage source converter according to the invention includes a line-side converter 2 and a load-side inverter 4, which are electrically connected with each other on their respective DC side by a slim DC link 6. The line-side converter 2 is implemented as a diode rectifier, whereas the load-side inverter 4 is implemented as a pulsed inverter. The slim DC link 6 can include, for example, a foil capacitor as a DC link capacitor $C_{ZW}$. A power grid 8 is connected to line input terminals of the converter 2. A three-phase motor 10 can be connected to output terminals of the inverter 4.

A decoupling diode 16 and a current limiter 18 are connected in series with a buffer capacitor $C_P$, and the series connection of decoupling diode 16, current limiter 18 and buffer capacitor $C_P$ is connected via a supply line 14 in parallel with the DC link capacitor $C_{ZW}$. The input side the buffer capacitor $C_P$ is connected to a power supply 12 that powers the electronics of the pulsed inverter. The decoupling diode 16 decouples the two capacitors $C_{ZW}$ and $C_P$ from each other. The recharging current for the buffer capacitor $C_p$ can be adjusted to a predetermined value with the current limiter 18. In the simplest case, the current limiter 18 is an ohmic resistor, whereby power is dissipated by the resistor 18 when a recharging current flows to the buffer capacitor $C_P$. The current limiter 18 can be designed to limit the recharging current to a maximum allowable value, which can advantageously be achieved by using an NTC thermistor as current limiter 18. Power is then only dissipated by the limiter 18 when the resistance value of the NTC thermistor increases.

The capacitance value of the buffer capacitor $C_P$ is selected to be sufficient to bridge a certain duration of a power line failure. Moreover, the frequency with which such power line failures occur can also be taken into consideration.

If power from power grid 8 is interrupted, then the DC link capacitor $C_{ZW}$ and the buffer capacitor $C_P$ are no longer be supplied with electric power from the grid 8. Because the buffer capacitor $C_P$ is decoupled from the DC link capacitor $C_{ZW}$, the latter can no longer be the discharged by the inverter load. Therefore, the stored energy of the buffer capacitor $C_P$ alone can be used to maintain the power supply of the electronics of the pulsed inverter. The voltage source converter then remains operational and can be powered up again to its nominal operating point when the line power returns. Since the DC link capacitor $C_{ZW}$ has a smaller capacitance value, the magnitude of the recharging current is so small that the diodes in the line-side diode rectifier need no longer be over-engineered with respect to the $I^2T$ value.

With this topology of a voltage source converter according to the invention, the converter has a higher service reliability which particularly countries with unstable power grids demand. The high service reliability can be achieved without adding circuit complexity at the line input of the converter. Because the buffered power supply is integrated in the converter itself, the voltage source converter according to the invention can be incorporated into electric circuits in the same manner as conventional frequency converters.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A voltage source converter comprising:
    a line-side diode rectifier;
    a load-side inverter having an electronic circuit;
    a power supply for the electronic circuit;
    a slim DC link having a DC link capacitor, said slim DC link directly connecting a DC output side of the line-side diode rectifier with a DC input side of the load-side inverter;
    a buffer capacitor connected across the power supply; and
    a decoupling diode and a current limiting circuit electrically connected in series with the buffer capacitor,
    wherein the series connection of the buffer capacitor, decoupling diode and current limiting circuit directly connected in parallel with the DC link capacitor.

2. The voltage source converter of claim 1, wherein the DC link capacitor comprises a foil capacitor.

3. The voltage source converter of claim 1, wherein the capacitance value of the buffer capacitor is selected so as to bridge a predetermined duration of a line power failure.

4. The voltage source converter of claim 1, wherein the current limiting circuit comprises a resistor.

5. The voltage source converter of claim 1, wherein the current limiting circuit comprises an NTC thermistor.

* * * * *